No. 888,315. PATENTED MAY 19, 1908.
G. COOPER.
KNOB ATTACHMENT.
APPLICATION FILED FEB. 19, 1906.
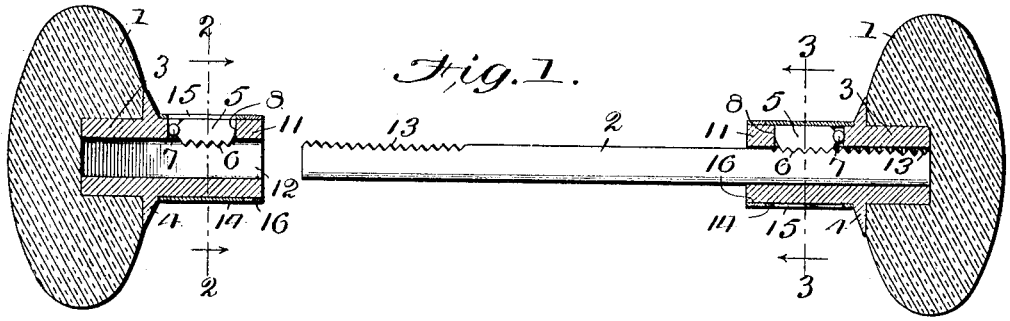
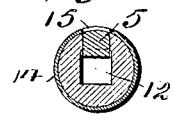 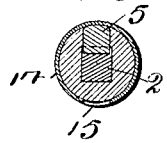
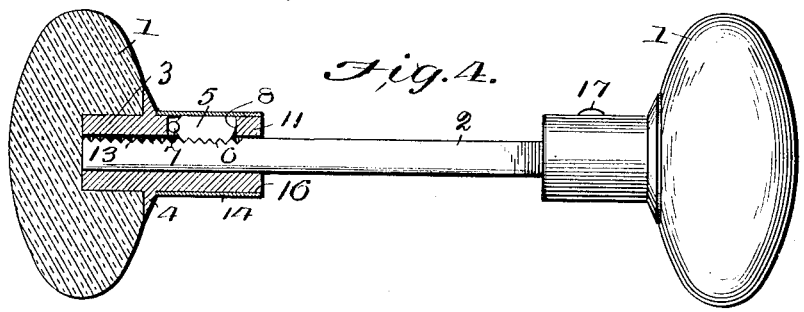
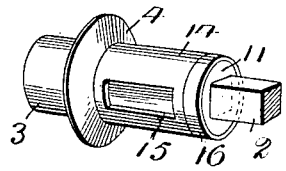 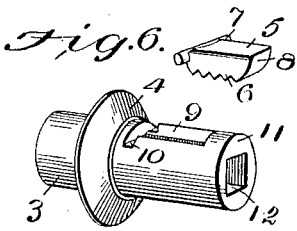
Witnesses
Elvie L. Page
Ada M. Gesner
George Cooper Inventor
by Holden and Holden
Attorneys

UNITED STATES PATENT OFFICE.

GEORGE COOPER, OF ANSONIA, CONNECTICUT, ASSIGNOR OF ONE-THIRD TO ROBERT G. RUSSELL AND ONE-THIRD TO PHILIP CAFFREY, OF ANSONIA, CONNECTICUT.

KNOB ATTACHMENT.

No. 888,315.　　　　Specification of Letters Patent.　　　Patented May 19, 1908.

Application filed February 19, 1906. Serial No. 301,735.

*To all whom it may concern:*

Be it known that I, GEORGE COOPER, a citizen of the United States, residing in Ansonia, in the county of New Haven, in the State of Connecticut, have invented a new and useful Improvement in Door-Knob Attachments, of which the following is a specification.

My invention relates to door knobs and particularly to that class of door knobs in which the shanks are detachable from their spindles without the use of screws, bolts or other separate fastening means.

The object of my invention is to produce a knob attachment in which the detachable shank can be locked to the spindle and at the same time present a flush surface and a concealed locking means; and with this object in view my invention consists in the features of construction and manner of operation, the details of which are set forth in the accompanying drawing in which like reference characters refer to corresponding parts.

In the drawings: Figure 1 is an elevation of a spindle and locking dogs, the knobs, shanks, sleeves and rims being shown in longitudinal section. Figs. 2 and 3 are transverse sections taken on lines 2—2 and 3—3 respectively in Fig. 1. Fig. 4 is an elevation of a spindle having my invention applied to one end thereof and a well-known form of knob and shank attached to the other end. Fig. 5 is a perspective view of my invention showing the spindle in its locked position but broken off. Fig. 6 is a perspective view of the shank and dog not assembled.

Referring to Fig. 1 on the drawing as the knob and its locking device on the left of the figure as a duplicate of that on the right I will confine my description to the left hand part of the figure in which the knob proper is represented by 1 having inserted in its inner face the lug 3 of the shank. The knob abuts against a flange 4 which encircles the shank and is tapered inwardly from its outer periphery to form a flush surface with that of the knob. Projecting inwardly from the flange is the shank proper or stem 11 having a rectangular recess or orifice therein. In this recess is journaled the dog 5 on its pivot pin 7 integral therewith but projecting on each side thereof forming transverse trunnions. The under side of the dog has serrations 6. The opposite end of the dog from that of the pivot pin is curved inwardly, said curve terminating at the base instead of the point of the tooth. The shank contains a longitudinal aperture rectangular in cross section to accommodate the end of the spindle 2. The recess 9 is cut out at its outer end forming the grooves 10 in which is journaled the pivot pin 7 of the dog 5. The end of the spindle 2 contains serrations 13 which are adapted to engage the serrations 6 on the dog. In Fig. 1 the right hand end of the device is of the same construction as the left as heretofore described. In Fig. 4 the right hand knob shank is fastened to the spindle by the well known means of a screw passing through the shank into the spindle. The rim 16 is fastened around the extreme end of the shank. Flush with the rim and extending between the same and the flange 4 is a loose sleeve 14, the outer surface of which is flush with the rim 16. The said sleeve contains an aperture 15 which has its length and width equal to or exceeding that of the dog 5.

Having now described the construction of my device I will proceed to explain the operation thereof. When it is desired to attach the shank to the spindle the latter is inserted in the longitudinal aperture 12 of the shank, the serrations on the dog riding along those on the spindle. During this time the dog vibrates on its pivot or it may be swung through the orifice 15 so that its serrations will be entirely clear of those on the spindle. When the spindle has been inserted as far as desired the dog is locked into engagement with the same by turning the sleeve around on the shank until the aperture in the former is out of alinement with that in the latter, thus preventing the dog from swinging upward or rising out of engagement with the shank. As the dog may engage the spindle at any place along its serrated portion the distance between the two knob flanges can be adjusted to accommodate the device to doors of varying thicknesses.

Throughout this specification I have used various terms for the sake of illustration, such as shank, dog, spindle, sleeve, aperture, serrations and recess, yet I do not wish to limit myself to the exact construction of the same as illustrated and described, but reserve the right to use any of the equivalents thereof provided the same are within the scope of my invention as pointed out in the appended claims.

What I claim, and desire to secure by Letters Patent is:

The combination with a longitudinally apertured knob shank having an integral flange at its knob end, a cylindrical rim at its inner end and a longitudinally extending recess in the side thereof, the outer surface of said shank being cut away to form transverse open grooves at one end of said recess, of a serrated spindle inserted in said shank, a serrated dog having integral transverse trunnions resting in said grooves and a cylindrical sleeve having an aperture therein incasing said shank from flange to rim and presenting a flush surface with the latter, the said sleeve being rotatably mounted to register said aperture with said recess to release said dog from said spindle and the said trunnions being free to play outwardly in said grooves when the dog is released from said spindle.

In testimony whereof, I have signed my name to this specification in the presence of two subscribing witnesses.

GEORGE COOPER.

Witnesses:
ELSIE L. PAGE,
ADA M. GESNER.